(12) United States Patent
Kim et al.

(10) Patent No.: US 7,321,630 B2
(45) Date of Patent: Jan. 22, 2008

(54) APPROXIMATION METHOD FOR SERIES EXPANSION OF INPUT FUNCTION AND SYSTEM USING THE SAME

(75) Inventors: Ki-yun Kim, Gwangmyeong-si (KR); Hyung-jin Choi, Seoul (KR); Ho Kim, Seoul (KR)

(73) Assignee: Samsung Thales Co., Ltd., Gumi, Kyungsangbuk-do (KR)

( * ) Notice: Subject to any disclaimer, the term of this patent is extended or adjusted under 35 U.S.C. 154(b) by 838 days.

(21) Appl. No.: 10/692,344

(22) Filed: Oct. 24, 2003

(65) Prior Publication Data

US 2004/0220983 A1  Nov. 4, 2004

(30) Foreign Application Priority Data

Apr. 30, 2003  (KR) .................... 10-2003-0027747

(51) Int. Cl.
*H04L 27/28* (2006.01)
*G06F 1/02* (2006.01)

(52) U.S. Cl. ...................................... 375/260; 708/270

(58) Field of Classification Search ................ 708/270, 708/200, 100; 375/260, 259, 377, 354, 371; 370/203, 208, 210, 464, 498, 537, 542
See application file for complete search history.

(56) References Cited

OTHER PUBLICATIONS

"*Approximation Algorithm of Series Expansion for Digital System Implementation*" by Ki-Yun Kim, Hyung-Jin Choi, and Ho Kim. IEICE Transactions on Fundamentals of Electronics, Communications and Computer Sciences, vol. E85-A, No. 11, Nov. 2002, pp. 2532-2537 (published by The Institute of Electronics, Information and Communication Engineers, Japan).

*Primary Examiner*—Pankaj Kumar
(74) *Attorney, Agent, or Firm*—Robert E. Bushnell, Esq.

(57) ABSTRACT

An approximation method and system for series expansion of functions include the steps and functions, respectively, of: expanding an input function in Taylor series up to an (N−1)-th term; expanding the input function in Taylor series up to the N-th term; multiplying the expanded result up to the (N−1)-th term by a predetermined weight α; combining the expanded result up to the (N−1)-th term, multiplied by α, and the expanded result up to the N-th term; and dividing the combined result by (α+1).

17 Claims, 8 Drawing Sheets

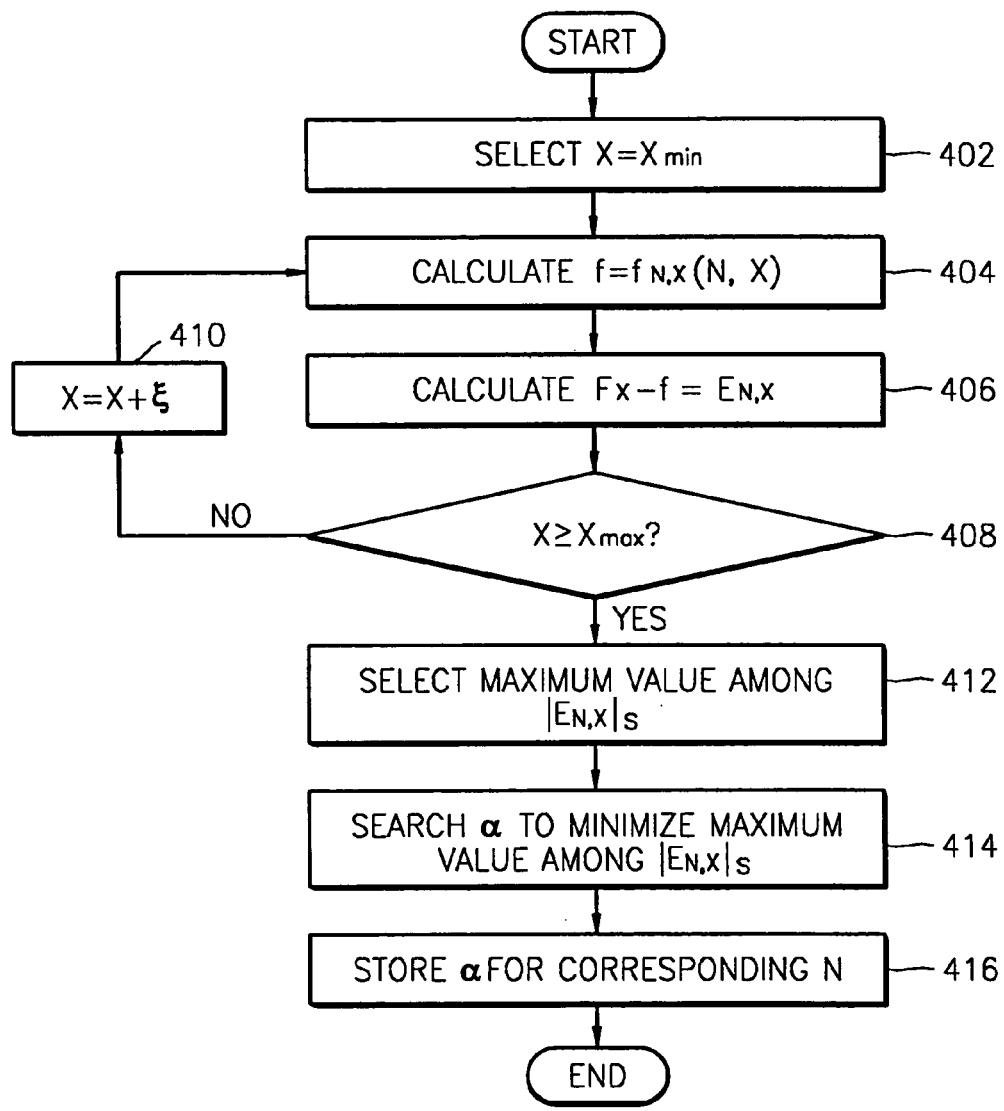

APPROXIMATION METHOD FOR SERIES EXPANSION OF INPUT FUNCTION AND SYSTEM USING THE SAME

CLAIM OF PRIORITY

This application makes reference to, incorporates the same herein, and claims all benefits accruing under 35 U.S.C. §119 from my application APPROXIMATION METHOD FOR SERIES EXPANSION OF INPUT FUNCTION AND SYSTEM USING THE SAME filed with the Korean Industrial Property Office on 30 Apr. 2003 and there duly assigned Serial No. 2003-27747.

BACKGROUND OF THE INVENTION

1. Technical Field

The present invention relates to an approximation method for series expansion of an input function and a system using the same, and, more particularly, to an approximation method and system for series expansion of an input function, which minimizes approximation errors in the series expansion of the input function of an arithmetic type.

2. Related Art

Generally, system design starts from upper level algorithm design, in which analysis and verification of the algorithm is performed, and is followed by lower level hardware design. In order to closely implement arithmetic functions used in the upper level algorithm design in the lower level hardware design, corresponding function values should be stored in a memory. In this case, since function values for every input variable should be reserved and stored, the memory should have a large capacity, resulting in a heavy burden in hardware design.

Accordingly, in system design, arithmetic functions for input variables are typically obtained by series expansion, rather than storing every function value for each input variable.

However, in practice, a series expansion formula cannot be implemented by a combination of an infinite number of terms to reach a nominal function value. Instead, a series expansion approximation formula, expanded using a finite number of terms, is typically used to obtain an approximate function value. In this case, an approximation error, or a truncation error, which represents a difference between the nominal function value and the approximated function value, occurs inevitably. Such an approximation error often causes critical malfunction or degradation of the system. A series expansion with as many terms as possible can reduce approximation errors, but it will automatically lead to a system of increased complexity required to implement such a series expansion.

Let us now assume that an arithmetic function $S(x)$ is expressed in an infinite series expansion with terms, $f_0(x)$, $f_1(x), f_2(x)$ as follows:

$$S(x) = \sum_{n=0}^{\infty} f_n(x) = f_0(x) + f_1(x) + f_2(x) + \cdots \quad (1)$$

For example, familiar trigonometric functions often employed in digital system design can be expanded in Taylor series about x=0. In this case, the terms of the trigonometric functions have alternating signs (+, −). Some common trigonometric functions expressed using Taylor series are as follows:

$$\cos(x) = \sum_{n=0}^{\infty} (-1)^n \frac{x^{2n}}{2n!} = 1 - \frac{x^2}{2!} + \frac{x^4}{4!} - \cdots \quad (2)$$

$$\sin(x) = \sum_{n=0}^{\infty} (-1)^n \frac{x^{2n+1}}{(2n+1)!} = x - \frac{x^3}{3!} + \frac{x^5}{5!} - \cdots \quad (3)$$

$$\arctan(x) = \sum_{n=0}^{\infty} (-1)^n \frac{x^{2n+1}}{2n+1} = x - \frac{x^3}{3} + \frac{x^5}{5} - \frac{x^7}{7} + \cdots \quad (4)$$

$$-1 \leq x \leq 1$$

However, in a fixed-point digital system, series expansion has a finite number of terms, thereby causing an approximation error. For example, if a partial sum, $$S_N(x) = \sum_{n=0}^{N} (-1)^n f_n(x)$$

is used to approximate the function, $$S(x) = \sum_{n=0}^{\infty} (-1)^n f_n(x),$$

the approximation error is expressed as $E_N(x)=S(x)-S_N(x)$. Since the absolute value $|E_N(X)|$ of the approximation error $E_N(X)$ increases with the absolute value $|x|$ of the input variable x, more terms in the series expansion are required to reduce the approximation error.

To reduce the approximation error in an alternating series expansion, the Euler approximation method is frequently used. In the Euler approximation method, the same series expansion formula as in the Taylor series is applied up to term (N−1), while an Euler transformation formula is applied for the rest of the terms. For example, the function $S(x)$ presented in equation (1) can be expressed as follows in equation (5):

$$\sum_{n=0}^{\infty} (-1)^n f_n = f_0 - f_1 + f_2 - \cdots - f_{N-1} + \sum_{n=0}^{\infty} \frac{(-1)^n}{2^{n+1}} [\Delta^n f_N], \quad (5)$$

for N = even wherein, $\Delta$ is called a forward difference operator and has the following characteristics:

$$\Delta f_N \equiv f_{N+1} - f_N$$

$$\Delta^2 f_N \equiv f_{N+2} - 2f_{N+1} + f_N \quad (6)$$

$$\Delta^3 f_N \equiv f_{N+3} - 3f_{N+2} + 3f_{N+1} - f_N, \text{ etc.}$$

The Euler approximation method, however, also has a problem in that the rightmost term should have a large number of terms to achieve an accurate approximation and it works only for N=even.

Therefore, there is a need to provide an efficient approximation method for series expansion of functions and a system therefor, which can minimize an approximation error and be simply implemented in practice.

SUMMARY OF THE INVENTION

The present invention provides an approximation method for series expansion of functions, and a system therefor, in which an approximation error of a nominal function value is efficiently minimized.

According to an aspect of the present invention, there is provided an approximation method for a series expansion of an input function with a finite number of terms N to minimize approximation error, comprising the steps of: expanding the input function in Taylor series up to an (N−1)-th term; expanding the input function in Taylor series up to an N-th term; multiplying a predetermined weight α and the expanded result up to the (N−1)-th term; and combining the expanded result up to the (N−1)-th term, multiplied by α, and the expanded result up to the N-th term; and dividing the combined result by (α+1).

It is preferable that α be greater than 0 and less than or equal to 1.

According to another aspect of the present invention, there is provided an approximation method for a series expansion of an input function with a finite number of terms N to minimize approximation error, comprising the steps of: expanding the input function in Taylor series up to an (N−1)-th term; multiplying an N-th term of the series expansion of the input function and a predetermined weight value; and combining the expanded result up to the (N−1)-th term and the multiplied N-th term to be an approximation function $f$ for the series expansion of the input function.

It is preferable that the predetermined weight value be $$\frac{(-1)^N}{(\alpha+1)}$$

for $0<\alpha\leq 1$.

It is preferable that α, obtained for corresponding respective N, be selected to minimize a maximum of the absolute approximation error.

It is preferable that α be obtained by: (a) selecting a minimum input in a given input x area; (b) calculating $f$ for the input with the finite number of terms N; (c) obtaining and storing an error $|E_{N,x}|$ by subtracting $f$ from a nominal function value of the input x; (d) determining whether the input x has reached a maximum value in the given input x area, adding a predetermined increment ξ to x if x has not yet reached the maximum value, and repeating steps from (b), (c) and (d); (e) if x has reached the maximum value, selecting a maximum error value among all the stored errors of $E_{N,x}$ for all inputs; and (f) searching α to minimize the maximum error value, and storing α as the weight value for corresponding N.

According to yet another aspect of the present invention, there is provided an approximation method for a series expansion of an input function with a finite number of terms N to minimize an approximation error, comprising the steps of: dividing a whole input area into several predetermined sub-intervals: expanding the input function in Taylor series up to an (N−1)-th term in each of the sub-intervals; multiplying an N-th term of the series expansion of the input function with a predetermined first weight for inputs on left side from a center of each of the sub-intervals, and with a predetermined second weight for inputs on right side from the center of each of the sub-intervals; and combining the expanded result up to the (N−1)-th term, and the multiplied N-th term with the predetermined first and second weights to be an approximation of the input function in each of the sub-intervals.

It is preferable that the predetermined first and second weights on the left and right side in each of the sub-intervals be selected to minimize a maximum error between the approximation of the input function with the finite number of terms N and a nominal value of the input function over all the inputs in a corresponding sub-interval.

According to still another aspect of the present invention, there is provided a method to compensate a carrier frequency offset in an orthogonal frequency division multiplexing (OFDM) system, comprising the steps of: estimating the carrier frequency offset $\hat{\epsilon}$ by using a series expansion of an arctangent function arctan(x); using the estimated offset to obtain a phase rotation value for a first input sample of k=1, wherein $\sin(2\pi\hat{\epsilon})$ and $\cos(2\pi\hat{\epsilon})$ are series-expanded to minimize an approximation error; using a phase rotation value for a previous input sample including k=1 to obtain a phase rotation value for subsequent input sample; and compensating the phase rotation values for all the input samples.

It is preferable that the estimated carrier frequency offset $\hat{\epsilon}$ be represented by, $$\hat{\epsilon} = \frac{1}{2\pi}\arctan\left\{\frac{\sum_{i=1}^{L}\text{Im}(y(-i)y*(L-i))}{\sum_{i=1}^{L}\text{Re}(y(-i)y*(L-i))}\right\}$$

where Re and Im represent a real part and an imaginary part of a complex number, respectively, y(i) represents an i-th received sample, L is a fast fourier transformation (FFT) size, and $\hat{\epsilon}$ is an estimated and normalized carrier frequency offset of $\Delta \hat{f} T$, where T is OFDM symbol duration.

It is preferable that the phase rotation value for the k-th sample be calculated by $$\text{For } k = 1, \cos(\Delta\hat{\omega}T_s) = \sum_{n=0}^{N}(-1)^n\frac{\Delta\hat{\omega}T_s^{2n}}{(2n)!}$$

$$\sin(\Delta\hat{\omega}T_s) = \sum_{n=0}^{N}(-1)^n\frac{\Delta\hat{\omega}T_s^{(2n+1)}}{(2n+1)!}$$

$$\text{For } k \geq 2, \cos(k\Delta\hat{\omega}T_s) = \cos((k-1)\Delta\hat{\omega}T_s + \Delta\hat{\omega}T_s)$$
$$= \cos((k-1)\Delta\hat{\omega}T_s)\cos(\Delta\hat{\omega}T_s) -$$
$$\sin((k-1)\Delta\hat{\omega}T_s)\sin(\Delta\hat{\omega}T_s)$$
$$\sin(k\Delta\hat{\omega}T_s) = \sin((k-1)\Delta\hat{\omega}T_s + \Delta\hat{\omega}T_s)$$
$$= \sin((k-1)\Delta\hat{\omega}T_s)\cos(\Delta\hat{\omega}T_s) +$$
$$\cos((k-1)\Delta\hat{\omega}T_s)\sin(\Delta\hat{\omega}T_s)$$

According to still another aspect of the invention, there is provided an approximation system for carrying out a series expansion of an input function with a finite number of terms N to minimize an approximation error, comprising an operational processing unit which expands the input function in Taylor series up to an (N−1)-th term, expands the input function in Taylor series up to an N-th term, multiplies a predetermined weight α and the expanded result up to the (N−1)-th term, combines the expanded result up to the (N−1)-th term, multiplied by α, and the expanded result up to the N-th term, and divides the combined result by (α+1).

It is preferable that α be greater than 0 and less than or equal to 1.

It is preferable that α obtained for a corresponding respective N be selected to minimize a maximum approximation error.

According to a further aspect of the invention, there is provide an approximation system for carrying out a series expansion of an input function with a finite number of terms N to minimize an approximation error, comprising an operational processing unit which expands the input function in Taylor series up to an (N−1)-th term, multiplies an N-th term of the series expansion function and a predetermined weight value, combines the expanded result up to the (N−1)-th term and the multiplied N-th term to be an approximation function $f$ for the series expansion function.

It is preferable that the predetermined weight value be $$\frac{(-1)^N}{(\alpha+1)}$$

for $0 < \alpha \leq 1$.

It is preferable that α obtained for a corresponding respective N be selected to minimize a maximum approximation error.

It is preferable that α be obtained by (a) selecting a minimum input in a given input x area; (b) calculating $f$ for the input with finite number of terms N; (c) obtaining and storing an error $E_{N,x}$ by subtracting $f$ from an nominal function value of the input x; (d) determining whether the input x has reached a maximum value in the given input x area, adding a predetermined increment $\xi$ to x if x has not yet reached the maximum value, and repeating steps (b), (c) and (d); (e) if x has reached the maximum value, selecting a maximum error value among all the stored errors of $E_{N,x}$ for all inputs; and (f) searching α to minimize the maximum error value, and storing α as the weight value for a corresponding N.

According to another aspect of the invention, there is provided an orthogonal frequency division multiplexing (OFDM) system for compensating a carrier frequency offset, comprising: an estimator for estimating the carrier frequency offset $\hat{\epsilon}$ by using a series expansion of a function arctran(x); a first phase rotation calculator for using the estimated offset to obtain a phase rotation value for a first input sample of k=1, wherein $\sin(2\pi\hat{\epsilon})$ and $\cos(2\pi\hat{\epsilon})$ are series-expanded to minimize an approximation error; a second phase rotation calculator for using a phase rotation value for a previous input sample including k=1 to obtain a phase rotation value for subsequent input sample; and a compensator for compensating the phase rotation values for all the input samples.

It is preferable that the estimated carrier frequency offset $\hat{\epsilon}$ be represented by $$\hat{\epsilon} = \frac{1}{2\pi}\arctan\left\{\frac{\sum_{i=1}^{L}\mathrm{Im}(y(-i)y*(L-i))}{\sum_{i=1}^{L}\mathrm{Re}(y(-i)y*(L-i))}\right\},$$

where Re and Im represent a real part and an imaginary part, respectively, of a complex number, y(i) represents an i-th received sample, L is a fast fourier transformation (FFT) size, and $\hat{\epsilon}$ is an estimated and normalized carrier frequency offset of $\Delta fT$.

It is preferable that the phase rotation value for the k-th sample be calculated by $$\text{For } k = 1, \cos(\Delta\hat{\omega}T_s) = \sum_{n=0}^{N}(-1)^n\frac{\Delta\hat{\omega}T_s^{2n}}{(2n)!}$$

$$\sin(\Delta\hat{\omega}T_s) = \sum_{n=0}^{N}(-1)^n\frac{\Delta\hat{\omega}T_s^{(2n+1)}}{(2n+1)!}$$

$$\text{For } k \geq 2, \cos(k\Delta\hat{\omega}T_s) = \cos((k-1)\Delta\hat{\omega}T_s + \Delta\hat{\omega}T_s)$$

$$= \cos((k-1)\Delta\hat{\omega}T_s)\cos(\Delta\hat{\omega}T_s) -$$

$$\sin((k-1)\Delta\hat{\omega}T_s)\sin(\Delta\hat{\omega}T_s)$$

$$\sin(k\Delta\hat{\omega}T_s) = \sin((k-1)\Delta\hat{\omega}T_s + \Delta\hat{\omega}T_s)$$

$$= \sin((k-1)\Delta\hat{\omega}T_s)\cos(\Delta\hat{\omega}T_s) +$$

$$\cos((k-1)\Delta\hat{\omega}T_s)\sin(\Delta\hat{\omega}T_s)$$

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a flowchart for calculating the weight α according to the present invention.

DETAILED DESCRIPTION OF THE INVENTION

The present invention provides an approximation method for series expansion of functions and a system therefor.

Figure 1:
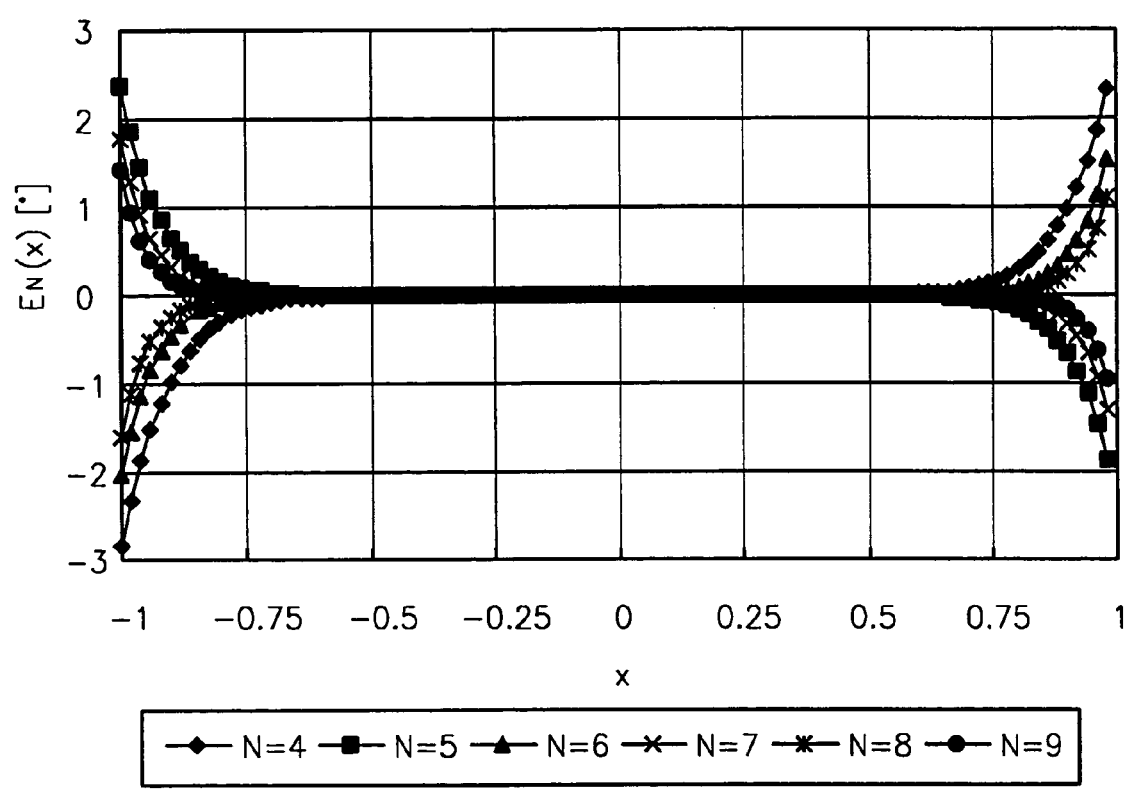
FIG. 1 is a graph showing approximation error characteristics of an arctangent function arctan(x), expanded in Taylor series with a finite number N of terms.

FIG. 1 is a graph showing approximation error characteristics, $E_N(X)$, of an arctangent function arctan(x) implemented by Taylor series expansion with various finite number of terms N. From FIG. 1, it can be noted that the approximation performance is better for inputs near x=0. In FIG. 1, for example, when N=9 and x=-1, it is shown that the approximation error is about 1.43 degree. This error may cause a critical system malfunction depending on the system characteristics.

From the approximation error characteristics in FIG. 1, the sign of $E_N(X)$ for an even and odd number of terms alternates at a given x. This is a common phenomenon for the approximation error characteristics of all the alternating series functions, such as cos(x), sin(x) functions, presented in equations (2) and (3). Table 1 shows the $E_N(X)$ sign characteristics of trigonometric functions sin(x), cos(x), and arctan(x).

TABLE 1

| Function name | sin(x) | | cos(x) | | arctan(x) | |
|---|---|---|---|---|---|---|
| N status | odd | Even | odd | even | odd | Even |
| x > 0 | − | + | − | + | − | + |
| x < 0 | + | − | − | + | + | − |

The trigonometric functions in Table 1 are convergent when approximated in series expansion, so that $$0 < \frac{|E_N(x)|}{|E_{N-1}(x)|} \leq 1$$

and sgn[$E_N(x)$]=sgn{$E_{N-1}(x)$}). In other words, the signs of $E_N(X)$ for even and odd numbers of terms are opposite to each other. By using these characteristics, a new approximation formula for series expansion may be provided as follows:

$$\tilde{S}_N(x) = \frac{1}{(\alpha+1)}(\alpha S_{N-1}(x) + S_N(x)) \quad (7)$$

For a given function, the approximation error of the function corresponding to a partial sum of (N−1) expansion terms, i.e., $S_{N-1}(x)$, is greater than one having the approximation error of the same function corresponding to sum of N expansion terms, i.e., $S_N(x)$, and the signs of the approximation errors are opposite to each other. To reduce the approximation error of $S_{N-1}(x)$, a weight $\alpha(0<\alpha\leq1)$ can be given to $S_{N-1}(x)$, while a weight of 1 is given to $S_N(x)$. In equation (7), the new approximation formula represents a combination of the partial sum of (N−1) expansion terms multiplied by the weight $\alpha$ and the sum of N expansion terms, averaged by $\alpha+1$. Further, based on the general formula of alternating series, $S_N(x)=S_{N-1}(x)+(-1)^N f_N(x)$, a new approximation formula can be obtained from equation (7) as follows:

$$\tilde{S}_N(x) = S_{N-1}(x) + \frac{(-1)^N}{(\alpha+1)} f_N(x) \quad (8)$$

Consequently, in the new approximation formula, where the finite number of expansion terms is assumed to be equal to N, the generally known series expansion formula is used for (N−1) terms, while $$\frac{(-1)^N}{(\alpha+1)}$$

is multiplied by an N-th term, thereby producing an efficient improved series expansion formula that reduces the approximation error. Equation (8) is simpler than equation (5) which uses an Euler approximation method, and is applicable not only to functions having an alternating series characteristic, but also to functions with general series expansion having convergence characteristic.

Figure 2:
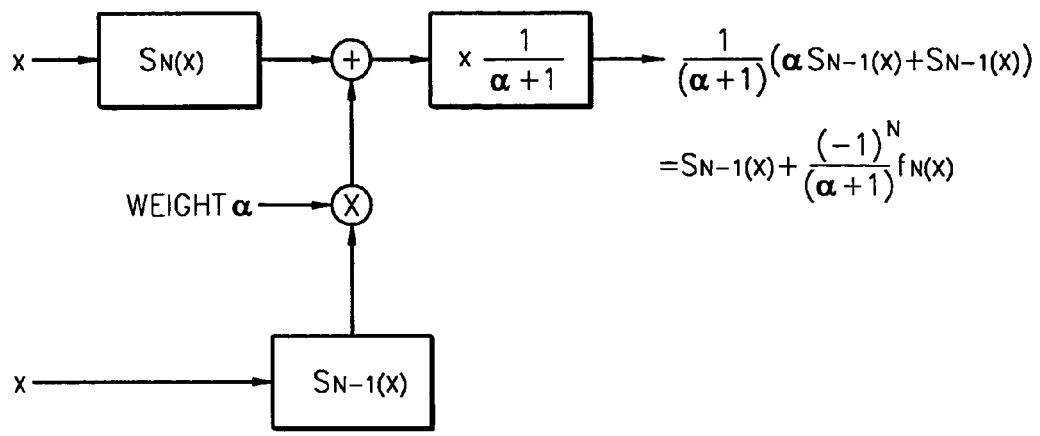
FIG. 2 is a schematic block diagram for implementing an approximation method for series expansion according to the present invention.

FIG. 2 is a schematic block diagram for implementing the approximation method for series expansion as described above. The functions of the block diagram can be implemented in an operational processing unit (not shown), such as a Digital Signal Processor (DSP).

Figure 3A:
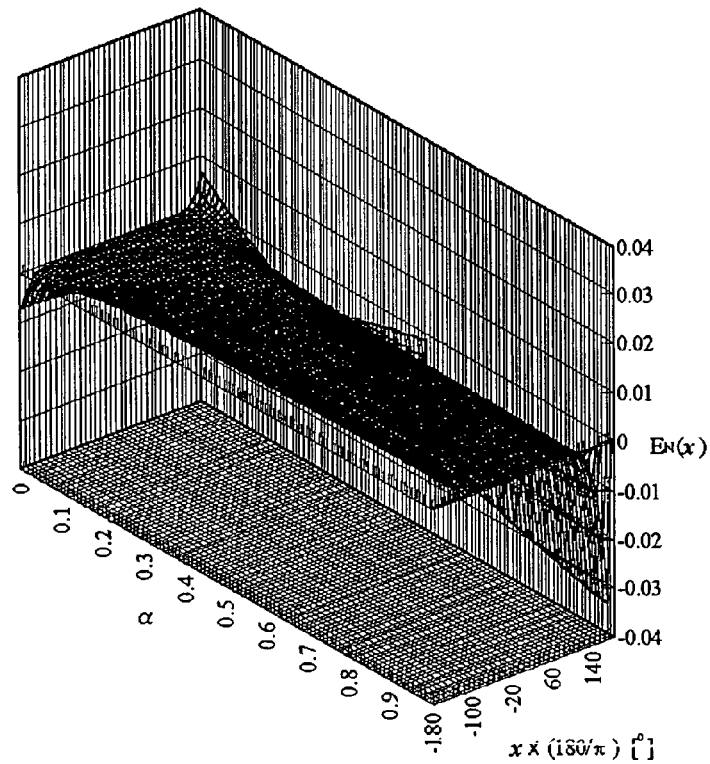
FIG. 3A~3C are graphs showing approximation error characteristics of sin(x), cos(x), arctan(x), respectively, according to various values of weight α, according to the present invention.
Figure 3B:
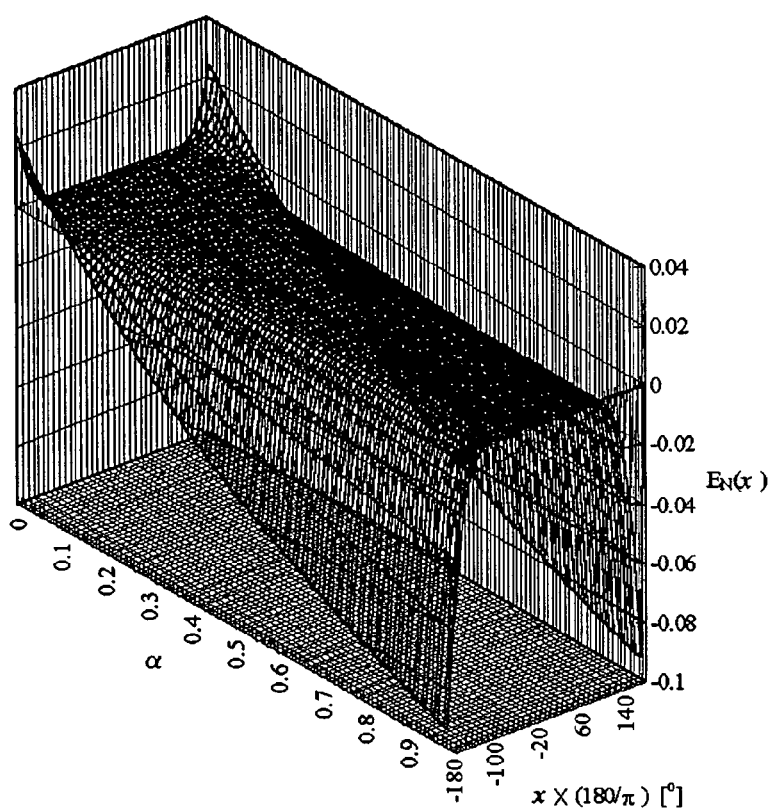
Figure 3C:
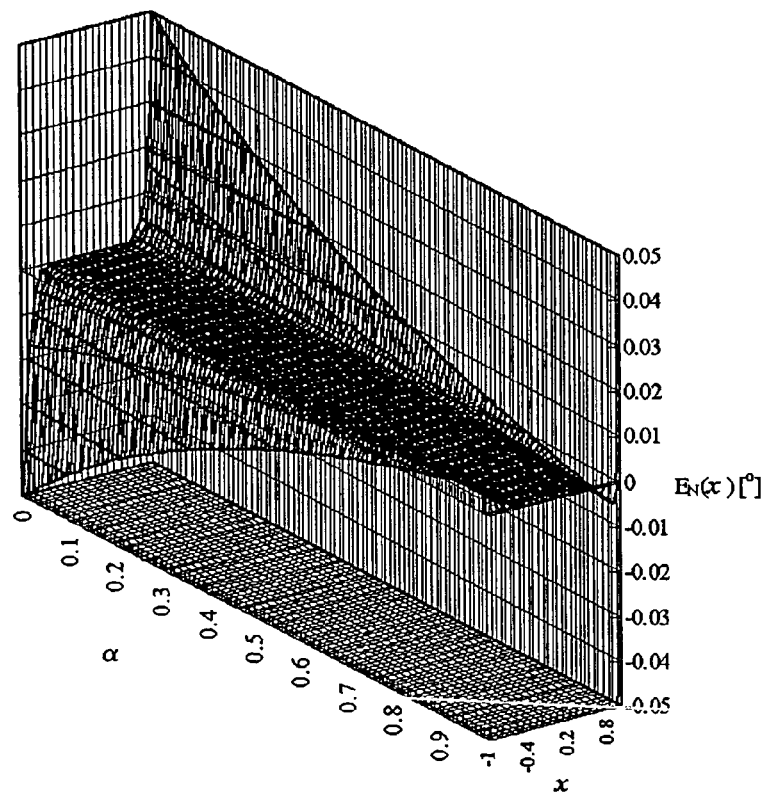

FIG. 3A~3C are graphs showing approximation errors $E_N(x)$ of sin(x), cos(x), arctan(x), respectively, according to various values of weight $\alpha$, when the approximation is performed using equation (8). Herein, the number of terms N is set, for example to 3, and the optimal value of a is obtained by searching for a value which minimizes the maximum of |$E_N(x)$|, the search being performed for $0<\alpha\leq1$, as represented in equation (9) as follows:

$$\min\{\max[|E_N(x)|]\} \quad (9)$$

In general, the optimal $\alpha$ depends on the number of terms N and the type of function to be expanded in series.

FIG. 4 is a flowchart for obtaining a weight $\alpha$ for a given N to minimize the maximum approximation error in a predetermined interval of input x.

A minimum value $x_{min}$ in the predetermined interval is selected in step 402.

By using equation (8), an approximation function $f=f_{N,x}$ (N,x) of a given function is calculated in step 404.

An approximation error value $E_{N,x}$ is obtained and stored by subtracting $f$ from a nominal function value F corresponding series expansion with an infinite number of terms in step 406.

If it is determined that present x is the maximum value within the predetermined interval in step 408, the method proceeds to step 412. If not, an accurately chosen increment $\xi$ is added to x in step 410 and the method goes back to step 404. Steps 404 thru 410 are repeated until x is equal to or greater than the maximum value $x_{max}$ in the predetermined interval.

If, in step 408, it is determined that x is equal to or greater than the maximum value $x_{max}$, in step 412 a maximum absolute approximation error is selected from among all of the approximation error values of |$E_{N,x}$| for all x's, stored in step 406. The selected maximum absolute approximation error may be a function of weight $\alpha$. Therefore, in step 414, a value of $\alpha$ to minimize the maximum absolute approximation error value can be calculated.

In step 416, the value of α calculated in step 414 is stored in a memory of the system which implements this approximation method.

When this approximation algorithm, based on equation 8, is implemented, α is set in advance depending on a pre-determined N set through computer simulation. An approximation error of a function expanded in Taylor series using equation (8), based on the block diagram of the present invention as shown in FIG. 2, by using the optimal weight value α in equation (8), is effectively reduced, compared with the approximation error obtained using the conventional Taylor series with α=0.

Figure 5A:
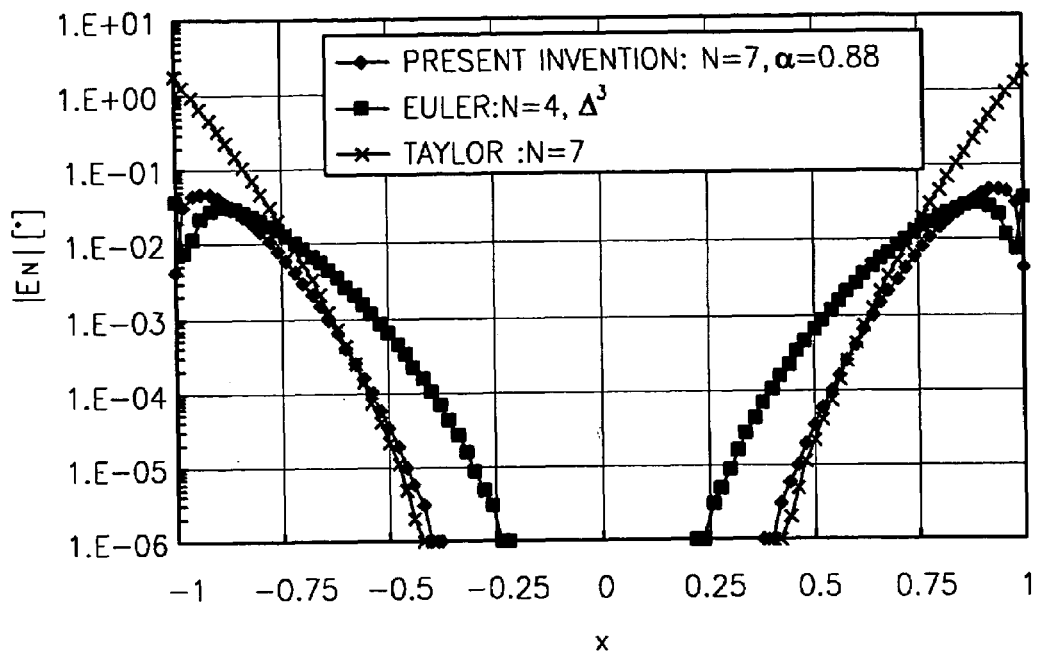
FIG. 5A is a graph comparing approximation error characteristic of arctan(x) at N=7, expanded according to Taylor series expansion, Euler approximation method, and an approximation method of the present invention.
Figure 5B:
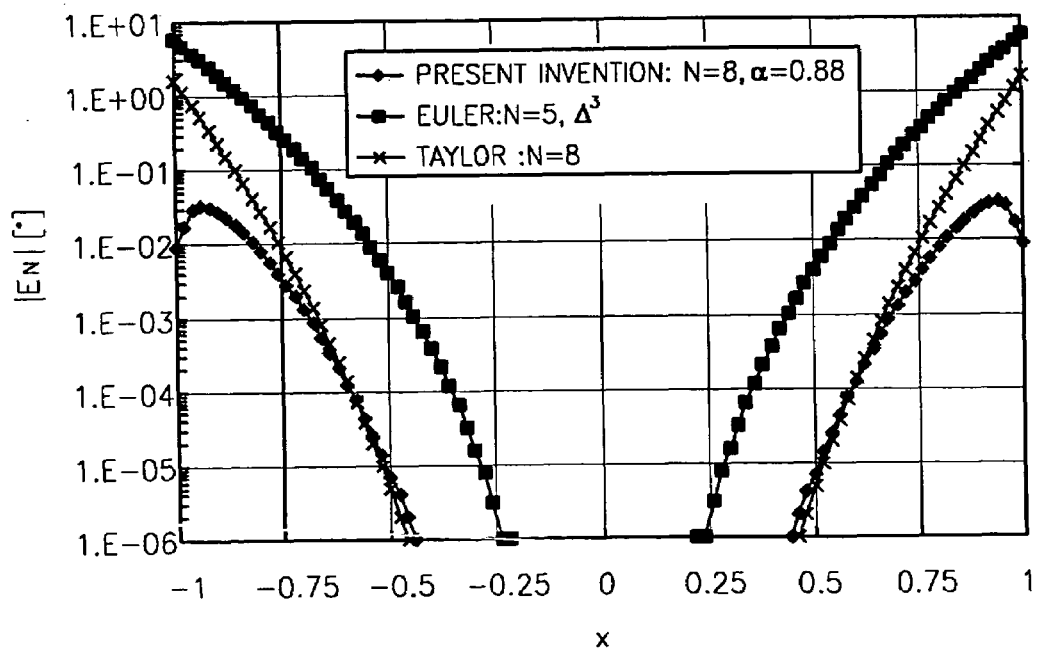
FIG. 5B is a graph comparing approximation error characteristic of arctan(x) at N=8, expanded according to Taylor series expansion, Euler approximation method, and an approximation method of the present invention.

FIG. 5A~5B are graphs for comparing approximation errors of arctan(x) according to the Taylor series expansion method, the Euler approximation method, and the approximation method of the present invention. For fairness in comparison, all these methods use the same order of the highest terms.

With regard to FIG. 5A, both of the approximation methods, the method according to the present invention and conventional Taylor series expansion, are expanded up to the $7^{th}$ term, i.e., N=7. The Euler approximation method is obtained using the Taylor series expansion up to $3^{rd}$ term, and by using the Euler transformation formula for the $4^{th}$ to $7^{th}$ terms. In FIG. 5A, the approximation error characteristics, according to the Euler approximation method, appear to be better than others for inputs whose absolute value |x| is nearer 1. However, it is shown that the approximation error characteristics according to the present invention is much better than the conventional Taylor series expansion and the Euler method in overall input areas.

Referring to FIG. 5B, in the case of N=5 and $\Delta^3$, the approximation error characteristics, according to the Euler approximation method, shows that the error is so large that desirable performance may not be expected. On the other hand, the approximation error characteristics according to the present invention are not much different from those in the case of N=7. Therefore, it is understood that the approximation method according to the present invention is easy to implement and approximates with superior performance regardless of the number of terms N.

If it is required to have a uniform approximation error characteristic over a wide input range, a method in which the input area is divided into several sub-intervals and the new approximation method for series expansion as described above according to the present invention is applied to a function in each of the sub-intervals, can be used (referred as a sub-interval divisional approximation method for short). The approximation error becomes much less with the sub-interval divisional approximation method. The sub-interval divisional approximation algorithm can prevent exponentially increasing approximation errors as input x becomes more distant from 0.

Figure 6A:
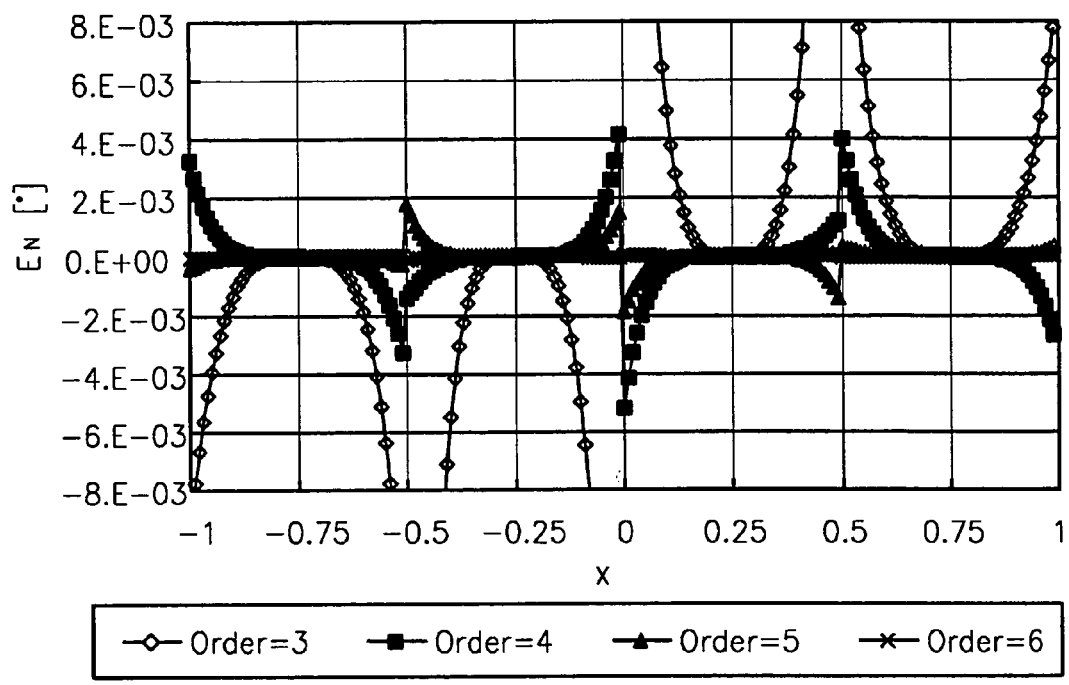
FIG. 6A shows an approximation error characteristic of function arctan(x), the input area [−1, 1] of which is divided into 4 intervals, each of which is centered at x=−0.75, x=−0.25, x=0.25 and x=0.75, respectively, and separately expanded according to the present invention in each of the 4 intervals.

FIG. 6A shows an approximation error characteristic of arctan(x), which is expanded by the sub-interval divisional approximation method, wherein inputs of arctan(x) are divided into 4 sub-intervals, each of which is centered at x=0.75, x=−0.25, x=0.25 and x=0.75, respectively, and arctan(x) in each sub-interval is series-expanded according to the present invention. In this sub-interval divisional approximation method, each approximation error characteristic does not necessarily take the form of alternating series as in the approximation algorithm, the input of which is centered at x=0. However, in each sub-interval, a corresponding arctangent function arctan(x) approximated by Taylor series expansion still maintains the convergence characteristic. Hence, the approximation error can be reduced in each sub-interval by combining the sum of (N−1) terms, expanded by Taylor series expansion, and the $N^{th}$ term multiplied by a weight β, obtained by using the same principle to obtain α as well as considering the sign characteristic. The sub-interval divisional approximation method, to be applied to corresponding sub-intervals, is represented as follows:

$$S_N(x)=S_{N-1}(x)+\beta f_N(x) \qquad (10)$$

For each sub-interval, there may be two values of β used. In other words, since the approximation error function may have the characteristic of an alternating series in the right or left directions with respect to a given center in each of the sub-intervals, each sub-interval should be further divided into 2 sub-intervals, for example, [−1, −0.75], [−0.75, −0.5], . . . [0.75, 1], and the optimal value of β is calculated in each of 8 sub-intervals. The optimal value of β in each of the 8 sub-intervals can be calculated in the same manner as that for obtaining α. The sub-interval divisional approximation method as described above may be implemented in any processor in the system having an operational processing function.

Figure 6B:
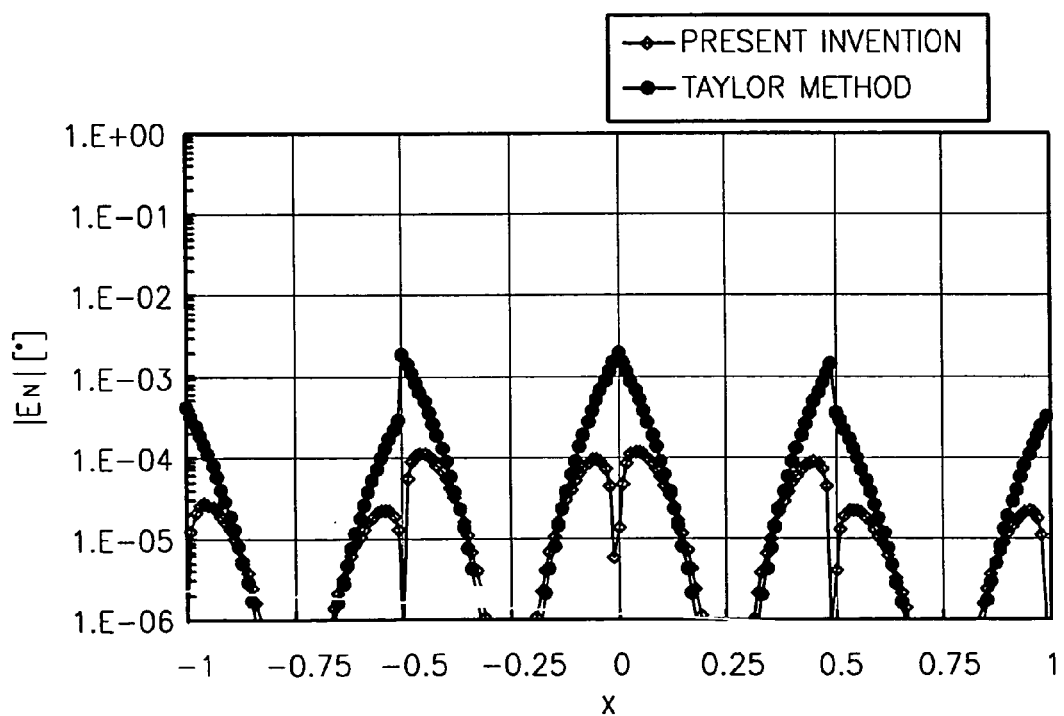
FIG. 6B shows two comparable absolute approximation error characteristics of function arctan(x) according to Taylor series expansion and an approximation method of the present invention, wherein four terms are used, and wherein inputs in both cases are divided into several intervals in which the arctangent function is separately expanded.

FIG. 6B shows two comparable approximation error characteristics of function arctan(x) implemented by Taylor series expansion and by the method of the present invention, respectively, input intervals in both cases being sub-divided, and both methods using the same number of expansion terms N=4. In FIG. 6B, β's for the 8 sub-intervals are obtained as 0.888, 1.10, 0.445, 1.56, 1.58, 0.465, 1.1, 0.892, respectively. Since the sub-interval divisional approximation approach using the Euler approximation method cannot be possible, the approximation error characteristic by the Euler approximation method for comparison are not shown in FIG. 6B. As shown in FIG. 6B, if an area [−1, 1] (from −1 to 1) is sub-divided into 4 sub-intervals, the approximation error characteristic according to the present invention becomes much less and more uniform over the input area than the error characteristic according to the conventional Taylor method. This performance can be more improved if the input area is divided more narrowly.

Accordingly, an approximation method and apparatus for a series expansion of functions, according to the present invention, can reduce the approximation error when expanded with a finite number of terms and has better applicability than Euler approximation method.

Now there will be described a carrier recovery process in an Orthogonal Frequency Division Multiplexing (OFDM) system to which an approximation method of the present invention is suitably applied. The carrier recovery process in OFDM system often involves Taylor series expansion of trigonometric functions, to which the present invention may be applied.

For carrier frequency offset estimation in OFDM system, the following equation (11) based on the rear part of OFDM symbol and the guard interval is generally used.

$$\hat{\varepsilon} = \frac{1}{2\pi}\arctan\left\{\frac{\sum_{i=1}^{L}\mathrm{Im}(y(-i)y*(L-i))}{\sum_{i=1}^{L}\mathrm{Re}(y(-i)y*(L-i))}\right\} \qquad (11)$$

where, Re and Im represent the real part and imaginary part, respectively, of a complex number, y(i) represents an i-th received sample, L is the fast fourier transformation (FFT) size, and $\hat{\varepsilon}$ is the estimated and normalized carrier frequency offset of $\Delta\hat{f}T$. When an arctan(x) in equation (1) is approximated by Taylor series expansion, the biggest approximation error occurs at x=±1, wherein $\hat{\varepsilon}$ is $\hat{\varepsilon}$=⅛, ±⅜. If it is assumed that the symbol period T=3.2 μsec as in IEEE 802.11a, the biggest estimation error by Taylor series expansion occurs at Δf=±39.1 KHz, and ±117.2 KHz. In addition, if the series expansion of arctan(x) resulted in an approximation error of A° (° means degree), this means that the normalized frequency offset of A/360 occurs regardless of the estimated frequency offset. Since an OFDM system is so susceptible to the frequency offset that even a small frequency offset can cause a substantial bit-error-rate (BER) degradation due to inter-carrier interference (ICI), the frequency offset must be kept to a minimum.

Such an estimated frequency offset $$\hat{\varepsilon} = \Delta \hat{f} T = \frac{\Delta \hat{\omega} T}{2\pi}$$

is compensated by using a trigonometric expansion formula like the following equation (12) to estimate the phase rotation angle of the k-th sample with sample interval $T_s$, that is $k\Delta wT_s$ in radians, like the following equation (13). Equation (13) is derived from the approximation principle of the present invention. In following equations (12) and (13), it is noted that initial estimation frequency offset value (for k=1) is preferably estimated to prevent cumulative offsets.

$$\sin(\alpha \pm \beta) = \sin(\alpha)\cos(\beta) \pm \cos(\alpha)\sin(\beta)$$

$$\cos(\alpha \pm \beta) = \cos(\alpha)\cos(\beta) \mp \sin(\alpha)\sin(\beta) \quad (12)$$

$$\text{For } k = 1, \cos(\Delta\hat{\omega}T_s) = \sum_{n=0}^{N} (-1)^n \frac{\Delta\hat{\omega}T_s^{2n}}{(2n)!} \quad (13)$$

$$\sin(\Delta\hat{\omega}T_s) = \sum_{n=0}^{N} (-1)^n \frac{\Delta\hat{\omega}T_s^{(2n+1)}}{(2n+1)!}$$

$$\text{For } k \geq 2, \cos(k\Delta\hat{\omega}T_s) = \cos((k-1)\Delta\hat{\omega}T_s + \Delta\hat{\omega}T_s)$$

$$= \cos((k-1)\Delta\hat{\omega}T_s)\cos(\Delta\hat{\omega}T_s) -$$

$$\sin((k-1)\Delta\hat{\omega}T_s)\sin(\Delta\hat{\omega}T_s)$$

$$\sin(k\Delta\hat{\omega}T_s) = \sin((k-1)\Delta\hat{\omega}T_s + \Delta\hat{\omega}T_s)$$

$$= \sin((k-1)\Delta\hat{\omega}T_s)\cos(\Delta\hat{\omega}T_s) +$$

$$\cos((k-1)\Delta\hat{\omega}T_s)\sin(\Delta\hat{\omega}T_s)$$

In equation (13), in order to compensate for the phase rotation for the first sample of k=1, the series expansion approximation algorithm is used to obtain $\cos(\Delta\hat{w}T_s)$ and $\sin(\Delta\hat{w}T_s)$. For samples following the first one, k≧2, the results of the trigonometric functions obtained for previous sample and for the first sample of k=1 are used to obtain corresponding values of trigonometric functions expanded as in equation (12). In most OFDM system, pilots are inserted in a data area despite the data efficiency loss to prevent phase rotation due to the frequency offset estimation error. However, in an OFDM system according to the present invention, since a series expansion approximation function of the present invention as described above is used to minimize the frequency offset estimation error, it is allowed to eliminate such a data efficiency loss factor.

Figure 7A:
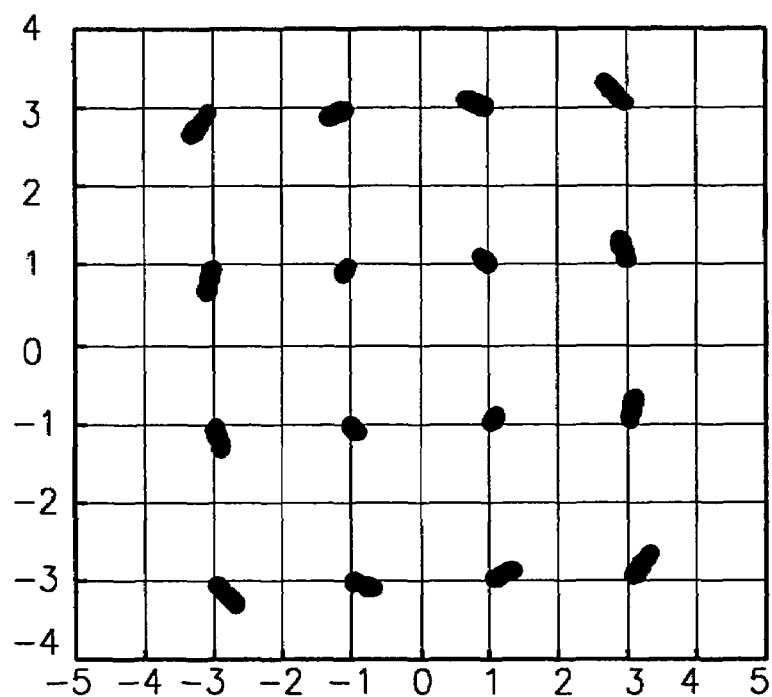
FIG. 7A~7C are constellation diagrams of the Quadrature Amplitue Modulation-Orthogonal Frequency Division Multiplexing (QAM-OFDM) for 10 OFDM symbols according to conventional series expansions and the present invention, respectively.
Figure 7B:
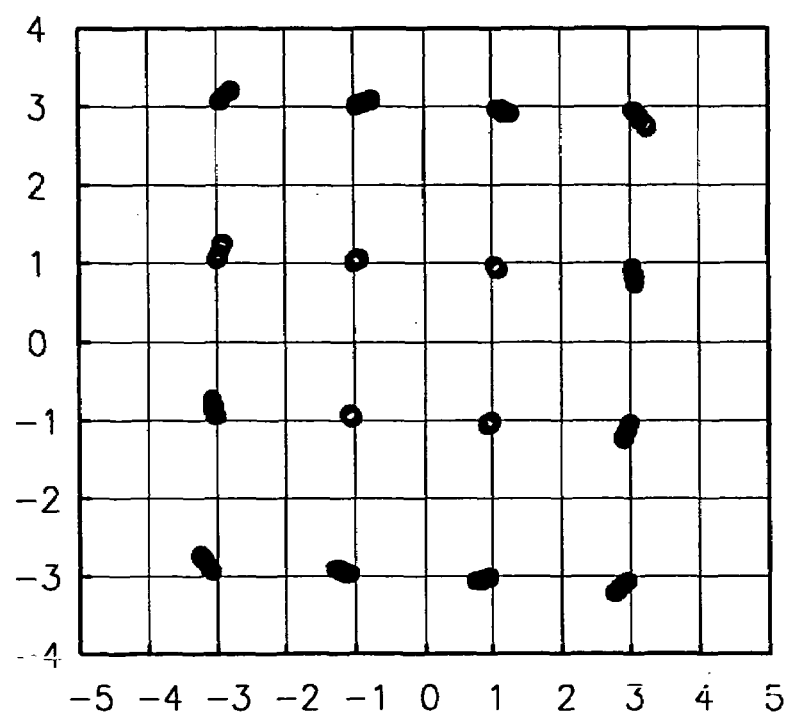
Figure 7C:
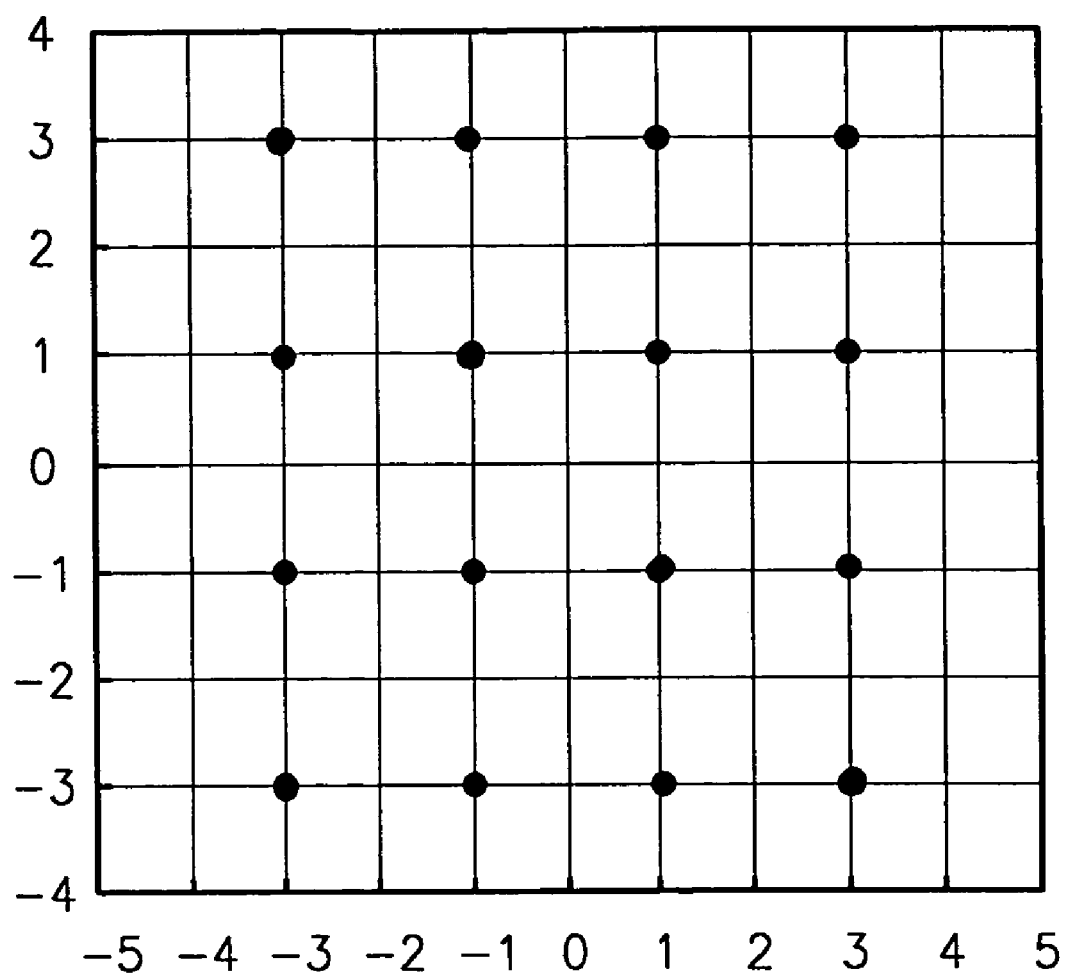

FIG. 7A~7C are constellation diagrams of the Quadrature Amplitude Modulation-Orthogonal Frequency Division Multiplexing (QAM-OFDM), observed for 10 OFDM symbols, according to a conventional series expansion approximation method and the approximation method of the present invention, respectively. Referring to FIG. 5 again, when the approximation method of the present invention was used at x=−0.94, the worst approximation error occurred. FIG. 7A and FIG. 7B have been created by performing Taylor series expansion of a function with a finite number of terms, N=7 and N=8, and resulting approximation errors 0.65° and 0.52°, respectively. FIG. 7C results from performing the approximation method according to the present invention. In FIG. 7C, when x=−0.94, the approximation error $|E_N(x)|$ is 0.047°. From the FIG. 7C, it is shown that QAM-OFDM constellation is placed in optimal position without phase rotation.

As described above, a new approximation method for Taylor series expansion according to the present invention enables a simple approximation to be made, is easy to be implemented, and minimizes the approximation error.

While this invention has been particularly shown and described with reference to preferred embodiments thereof, it will be understood by those skilled in the art that various changes in form and detail maybe made therein without departing from the spirit and scope of the invention as defined by the appended claims.

What is claimed is:

1. An approximation system for a series expansion of an input function with a finite number of terms N to minimize an approximation error, said system including an operational processing unit, said operational processing unit comprising:
    means for expanding the input function in Taylor series up to an (N−1)-th term to obtain a first expansion result;
    means for expanding the input function in Taylor series up to an N-th term to obtain a second expansion result;
    means for multiplying the first expansion result by a predetermined weight α to obtain a multiplication result;
    means for combining the multiplication result and the second expansion result to obtain a combined result; and
    means for dividing the combined result by (α+1);
    whereby to minimize the approximation error.

2. The system of claim 1, wherein α is greater than 0 and no greater than 1.

3. The system of claim 1, wherein α obtained for a corresponding respective N is selected so as to minimize a maximum approximation error.

4. The system of claim 1, wherein the operational processing unit further comprises:
    means for using the approximation to obtain a phase rotation value for a first input sample of k=1, wherein sin(2πê) and cos(2πê) are series-expanded to minimize the approximation error;
    means for using a phase rotation value for a previous input sample including k=1 to obtain a phase rotation value for a subsequent input sample; and
    means for compensating the phase rotation values for all input samples.

5. The system of claim 4, wherein an estimated carrier frequency effect ê is represented by $$\hat{\varepsilon} = \frac{1}{2\pi} \arctan \left\{ \frac{\sum_{i=1}^{L} \text{Im}(y(-i)y^*(L-i))}{\sum_{i=1}^{L} \text{Re}(y(-i)y^*(L-i))} \right\},$$

where Re and Im represent a real part and an imaginary part, respectively, of a complex number, y(i) represents an i-th received sample, L is a fast fourier transformation (FFT) size, and $\hat{\epsilon}$ is an estimated and normalized carrier frequency offset of $\Delta \hat{f} T$.

6. The system of claim 5, wherein the phase rotation value for a k-th sample is calculated by:

$$\text{For } k = 1, \cos(\Delta \hat{\omega} T_s) = \sum_{n=0}^{N} (-1)^n \frac{\Delta \hat{\omega} T_s^{2n}}{(2n)!}$$

$$\sin(\Delta \hat{\omega} T_s) = \sum_{n=0}^{N} (-1)^n \frac{\Delta \hat{\omega} T_s^{(2n+1)}}{(2n+1)!}$$

$$\text{For } k \geq 2, \cos(k \Delta \hat{\omega} T_s) = \cos((k-1)\Delta \hat{\omega} T_s + \Delta \hat{\omega} T_s)$$
$$= \cos((k-1)\Delta \hat{\omega} T_s)\cos(\Delta \hat{\omega} T_s) -$$
$$\sin((k-1)\Delta \hat{\omega} T_s)\sin(\Delta \hat{\omega} T_s)$$
$$\sin(k \Delta \hat{\omega} T_s) = \sin((k-1)\Delta \hat{\omega} T_s + \Delta \hat{\omega} T_s)$$
$$= \sin((k-1)\Delta \hat{\omega} T_s)\cos(\Delta \hat{\omega} T_s) +$$
$$\cos((k-1)\Delta \hat{\omega} T_s)\sin(\Delta \hat{\omega} T_s).$$

7. An approximation system for a series expansion of an input function with a finite number of terms N to minimize an approximation error, said system including an operational processing unit, said operational processing unit comprising:
means for expanding the input function in Taylor series up to an (N−1)-th term to obtain an expansion result;
means for multiplying an N-th term of the expansion result by a predetermined weight value to obtain a multiplication result; and
means for combining the expansion result and the multiplication result to obtain an approximation function $f$ for the series expansion function;
whereby to minimize the approximation error.

8. The system of claim 7, wherein the predetermined weight value is $$\frac{(-1)^N}{(\alpha+1)}.$$

9. The system of claim 8, wherein α obtained for corresponding respective N is selected to minimize a maximum approximation error.

10. The system of claim 9, wherein α is obtained by:
(a) selecting a minimum input in a given input x area;
(b) calculating the approximation function $f$ for the input function with the finite number of terms N
(c) obtaining and storing an error $E_{N,x}$ by subtracting approximation function $f$ from a nominal function value of the input x;
(d) determining whether the input x has reached a maximum value in the given input x area, adding a predetermined increment ξ to x when x has not yet reached the maximum value, and repeating steps (b), (c) and (d);
(e) selecting a maximum error value among all the stored errors $E_{N,x}$ for all inputs when x has reached a maximum value; and
(f) searching α to minimize the maximum error value, and storing α as the weight value for a corresponding N.

11. The system of claim 7, said operational processing unit further comprising:
means for using the approximation to obtain a phase rotation value for a first input sample of k=1, wherein sin(2πê) and cos(2ê) are series-expanded to minimize the approximation error;
means for using a phase rotation value for a previous input sample including k=1 to obtain a phase rotation value for a subsequent input sample; and
means for compensating the phase rotation values for all input samples.

12. The system of claim 11, wherein an estimated carrier frequency effect ê is represented by $$\hat{\epsilon} = \frac{1}{2\pi} \arctan \left\{ \frac{\sum_{i=1}^{L} \text{Im}(y(-i)y^*(L-i))}{\sum_{i=1}^{L} \text{Re}(y(-i)y^*(L-i))} \right\},$$

where Re and Im represent a real part and an imaginary part, respectively, of a complex number, y(i) represents an i-th received sample, L is a fast fourier transformation (FFT) size, and $\hat{\epsilon}$ is an estimated and normalized carrier frequency offset of $\Delta \hat{f} T$.

13. The system of claim 12, wherein the phase rotation value for a k-th sample is calculated by:

$$\text{For } k = 1, \cos(\Delta \hat{\omega} T_s) = \sum_{n=0}^{N} (-1)^n \frac{\Delta \hat{\omega} T_s^{2n}}{(2n)!}$$

$$\sin(\Delta \hat{\omega} T_s) = \sum_{n=0}^{N} (-1)^n \frac{\Delta \hat{\omega} T_s^{(2n+1)}}{(2n+1)!}$$

$$\text{For } k \geq 2, \cos(k \Delta \hat{\omega} T_s) = \cos((k-1)\Delta \hat{\omega} T_s + \Delta \hat{\omega} T_s)$$
$$= \cos((k-1)\Delta \hat{\omega} T_s)\cos(\Delta \hat{\omega} T_s) -$$
$$\sin((k-1)\Delta \hat{\omega} T_s)\sin(\Delta \hat{\omega} T_s)$$
$$\sin(k \Delta \hat{\omega} T_s) = \sin((k-1)\Delta \hat{\omega} T_s + \Delta \hat{\omega} T_s)$$
$$= \sin((k-1)\Delta \hat{\omega} T_s)\cos(\Delta \hat{\omega} T_s) +$$
$$\cos((k-1)\Delta \hat{\omega} T_s)\sin(\Delta \hat{\omega} T_s).$$

14. An orthogonal frequency division multiplexing (OFDM) system for compensating a carrier frequency offset, said system comprising:
an estimator for estimating the carrier frequency offset ê by using a series expansion of a function arctan(x);
a first phase rotation calculator for using the estimated carrier frequency offset to obtain a phase rotation value for a first input sample of k=1, wherein sin(2πê) and cos(2πê) are series-expanded to minimize an approximation error;
a second phase rotation calculator for using a phase rotation value for a previous input sample including k=1 to obtain a phase rotation value for a subsequent input sample; and
a compensator for compensating the phase rotation values for all input samples, thereby compensating the carrier frequency offset.

15. The system of claim 14, wherein the estimated carrier frequency offset ê is represented by $$\hat{\varepsilon} = \frac{1}{2\pi}\arctan\left\{\frac{\sum_{i=1}^{L}\text{Im}(y(-i)y*(L-i))}{\sum_{i=1}^{L}\text{Re}(y(-i)y*(L-i))}\right\},$$

where Re and Im represent a real part and an imaginary part, respectively, of a complex number, y(i) represents an i-th received sample, L is a fast fourier transformation (FFT) size, and ê is an estimated and normalized carrier frequency offset of $\Delta \hat{f}T$.

16. The system of claim 15, wherein the phase rotation value for a k-th sample is calculated by:

$$\text{For } k = 1, \cos(\Delta\hat{\omega}T_s) = \sum_{n=0}^{N}(-1)^n\frac{\Delta\hat{\omega}T_s^{2n}}{(2n)!}$$

$$\sin(\Delta\hat{\omega}T_s) = \sum_{n=0}^{N}(-1)^n\frac{\Delta\hat{\omega}T_s^{(2n+1)}}{(2n+1)!}$$

$$\text{For } k \geq 2, \cos(k\Delta\hat{\omega}T_s) = \cos((k-1)\Delta\hat{\omega}T_s + \Delta\hat{\omega}T_s)$$
$$= \cos((k-1)\Delta\hat{\omega}T_s)\cos(\Delta\hat{\omega}T_s) -$$
$$\sin((k-1)\Delta\hat{\omega}T_s)\sin(\Delta\hat{\omega}T_s)$$

-continued
$$\sin(k\Delta\hat{\omega}T_s) = \sin((k-1)\Delta\hat{\omega}T_s + \Delta\hat{\omega}T_s)$$
$$= \sin((k-1)\Delta\hat{\omega}T_s)\cos(\Delta\hat{\omega}T_s) +$$
$$\cos((k-1)\Delta\hat{\omega}T_s)\sin(\Delta\hat{\omega}T_s).$$

17. The system of claim 14, wherein the phase rotation value for a k-th sample is calculated by:

$$\text{For } k = 1, \cos(\Delta\hat{\omega}T_s) = \sum_{n=0}^{N}(-1)^n\frac{\Delta\hat{\omega}T_s^{2n}}{(2n)!}$$

$$\sin(\Delta\hat{\omega}T_s) = \sum_{n=0}^{N}(-1)^n\frac{\Delta\hat{\omega}T_s^{(2n+1)}}{(2n+1)!}$$

$$\text{For } k \geq 2, \cos(k\Delta\hat{\omega}T_s) = \cos((k-1)\Delta\hat{\omega}T_s + \Delta\hat{\omega}T_s)$$
$$= \cos((k-1)\Delta\hat{\omega}T_s)\cos(\Delta\hat{\omega}T_s) -$$
$$\sin((k-1)\Delta\hat{\omega}T_s)\sin(\Delta\hat{\omega}T_s)$$

$$\sin(k\Delta\hat{\omega}T_s) = \sin((k-1)\Delta\hat{\omega}T_s + \Delta\hat{\omega}T_s)$$
$$= \sin((k-1)\Delta\hat{\omega}T_s)\cos(\Delta\hat{\omega}T_s) +$$
$$\cos((k-1)\Delta\hat{\omega}T_s)\sin(\Delta\hat{\omega}T_s).$$

* * * * *